(12) United States Patent
Shooshtari et al.

(10) Patent No.: US 9,676,954 B2
(45) Date of Patent: *Jun. 13, 2017

(54) FORMALDEHYDE-FREE BINDER COMPOSITIONS AND METHODS OF MAKING THE BINDERS UNDER CONTROLLED ACIDIC CONDITIONS

(75) Inventors: Kiarash Alavi Shooshtari, Littleton, CO (US); Uranchimeg Lester, Littleton, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,765

(22) Filed: May 23, 2012

(65) Prior Publication Data

US 2013/0125783 A1    May 23, 2013

Related U.S. Application Data

(63) Continuation-in-part of application No. 12/539,263, filed on Aug. 11, 2009, now Pat. No. 9,365,963.

(51) Int. Cl.
*C09D 101/02* (2006.01)
*C03C 25/32* (2006.01)
(Continued)

(52) U.S. Cl.
CPC .......... *C09D 101/02* (2013.01); *C03C 25/321* (2013.01); *C08G 12/22* (2013.01);
(Continued)

(58) Field of Classification Search
CPC ........ C03C 5/26; C08G 73/028; C08G 12/22; C08J 5/043; C08J 5/24; C08K 5/07;
(Continued)

(56) References Cited

U.S. PATENT DOCUMENTS 1,801,053 A    4/1931    Meigs
3,006,879 A    10/1961   Ryan et al.
(Continued)

FOREIGN PATENT DOCUMENTS

DE    1905054 A1    8/1969
DE    4308089    *    9/1994
(Continued)

OTHER PUBLICATIONS

Opposition filed Sep. 26, 2014 by Knauf Insulation to European Patent No. EP2464771 granted Dec. 25, 2013, 21 pages.
(Continued)

*Primary Examiner* — Camie Thompson
(74) *Attorney, Agent, or Firm* — Robert D. Touslee (57) ABSTRACT

Formaldehyde-free binder compositions are described that include an aldehyde or ketone, a reaction product between a polyamine and an organic anhydride, and an acidic compound. The acidic compound may be an organic acid, an acidic catalyst, or both. The acidic compound is supplied in quantities that lower the pH of the binder composition to about 5 or less. The binder compositions may be used in methods of binding fiberglass and the resulting fiberglass products have an improved tensile strength due to the addition of the acidic compound.

16 Claims, 3 Drawing Sheets

(51) Int. Cl.
*D04H 1/587* (2012.01)
*C08G 12/22* (2006.01)
*C08K 7/14* (2006.01)
*C08K 5/07* (2006.01)

(52) U.S. Cl.
CPC ............... *C08K 7/14* (2013.01); *D04H 1/587* (2013.01); *C08K 5/07* (2013.01)

(58) Field of Classification Search
CPC ... C08L 61/32; C08L 5/00; C09J 13/02; C09J 179/02; D04H 1/587; D04H 1/64; D04H 1/4218; C09D 105/00; D06M 15/05; Y10T 442/60; Y10T 442/30
USPC ............ 106/162.1; 524/27, 56, 58; 442/327; 210/505–508; 427/389.8, 389.9, 394
See application file for complete search history.

(56) References Cited

U.S. PATENT DOCUMENTS

| | | | |
|---|---|---|---|
| 3,383,267 A | 5/1968 | Sundén | |
| 3,513,001 A | 5/1970 | Worthington et al. | |
| 4,048,127 A | 9/1977 | Gibbons et al. | |
| 4,361,465 A * | 11/1982 | Graham | C03C 25/26 |
| | | | 162/156 |
| 4,410,685 A | 10/1983 | Williams | |
| 5,905,115 A | 5/1999 | Luitjes et al. | |
| 6,387,506 B1 * | 5/2002 | Kawamura et al. | 428/413 |
| 7,265,169 B2 | 9/2007 | Li et al. | |
| 7,655,711 B2 | 2/2010 | Swift et al. | |
| 8,372,900 B2 | 2/2013 | Shooshtari et al. | |
| 8,377,564 B2 | 2/2013 | Shooshtari et al. | |
| 8,651,285 B2 | 2/2014 | Shooshtari et al. | |
| 8,708,162 B2 | 4/2014 | Shooshtari et al. | |
| 9,365,963 B2 * | 6/2016 | Shooshtari | C03C 25/321 |
| 2005/0221705 A1 | 10/2005 | Hitch | |
| 2007/0027283 A1 | 2/2007 | Swift et al. | |
| 2007/0082208 A1 * | 4/2007 | Shooshtari et al. | 428/474.4 |
| 2007/0123679 A1 | 5/2007 | Swift et al. | |
| 2007/0123680 A1 | 5/2007 | Swift et al. | |
| 2008/0160854 A1 | 7/2008 | Nandi et al. | |
| 2010/0129640 A1 * | 5/2010 | Kelly | C08J 7/047 |
| | | | 428/323 |
| 2011/0039111 A1 * | 2/2011 | Shooshtari | 428/426 |
| 2011/0040010 A1 | 2/2011 | Shooshtari | |
| 2011/0042302 A1 | 2/2011 | Shooshtari et al. | |
| 2011/0042303 A1 | 2/2011 | Shooshtari et al. | |
| 2011/0045966 A1 | 2/2011 | Shooshtari et al. | |
| 2011/0046271 A1 | 2/2011 | Shooshtari et al. | |
| 2012/0037836 A1 * | 2/2012 | Hansen | 252/62 |
| 2012/0183723 A1 * | 7/2012 | Srinivasan | C08G 73/028 |
| | | | 428/106 |

FOREIGN PATENT DOCUMENTS

| | | |
|---|---|---|
| DE | 102004033561 A1 | 9/2005 |
| EP | 1510607 A1 | 3/2005 |
| EP | 1652868 A1 | 5/2006 |
| EP | 2223941 A1 | 9/2010 |
| EP | 2386605 A1 | 11/2011 |
| EP | 2464771 B1 | 12/2013 |
| EP | 2464772 B1 | 12/2013 |
| EP | 2467519 B1 | 12/2013 |
| GB | 2451719 A | 2/2009 |
| WO | 00/17120 | 3/2000 |
| WO | 03/022899 A1 | 3/2003 |
| WO | 2004/007615 A1 | 1/2004 |
| WO | 2007/014236 A2 | 2/2007 |
| WO | 2009/149334 A2 | 12/2009 |
| WO | 2010/106181 A1 | 9/2010 |
| WO | 2010/108999 A1 | 9/2010 |
| WO | 2010/142568 A1 | 12/2010 |
| WO | 2011/019590 A1 | 2/2011 |
| WO | 2011/019597 A1 | 2/2011 |
| WO | 2011/022227 A1 | 2/2011 |

OTHER PUBLICATIONS

Opposition filed Sep. 26, 2014 by Knauf Insulation to European Patent No. EP2467519 granted Dec. 25, 2013, 10 pages.
Opposition filed Sep. 26, 2014 by Knauf Insulation to European Patent No. EP2464772 granted Dec. 25, 2013, 13 pages.
Opposition filed Jul. 17, 2015, by Knauf Insulation to European Patent No. EP2467520 granted Oct. 8, 2014, 6 pages.

* cited by examiner

FORMALDEHYDE-FREE BINDER COMPOSITIONS AND METHODS OF MAKING THE BINDERS UNDER CONTROLLED ACIDIC CONDITIONS

CROSS-REFERENCES TO RELATED APPLICATIONS

This application is a continuation-in-part of co-assigned U.S. patent application Ser. No. 12/539,263 filed Aug. 11, 2009. It is also related to co-assigned U.S. patent application Ser. Nos. 12/539,211; 12/543,607; 12/543,586; 12/543,625; 12/543,574; 12/633,828; 13/386,843; and 13/386,865. The entire contents of the above-listed applications are herein incorporated by reference for all purposes.

BACKGROUND OF THE INVENTION

The subject invention pertains to an improved binding composition for use with fiberglass. More specifically, the invention pertains to an improved curable composition comprising an addition product of an amine and a reactant in the form of an amino-amide intermediate. An aldehyde or ketone is added to the amino-amide to form a composition which upon curing is capable of forming a water-insoluble polymer composition which displays good adhesion to glass. Once applied to the fiberglass, the binding composition is cured. The binder of the present invention is useful as a fully acceptable replacement for formaldehyde-based binders in non-woven fiberglass products, and actually provides a binder exhibiting improved physical properties.

Fiberglass binders have a variety of uses ranging from stiffening applications where the binder is applied to woven or non-woven fiberglass sheet goods and cured, producing a stiffer product; thermo-forming applications wherein the binder resin is applied to a sheet or lofty fibrous product, following which it is dried and optionally B-staged to form an intermediate but yet curable product; and to fully cured systems such as building insulation.

Fibrous glass insulation products generally comprise matted glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder has been used throughout the fibrous glass insulation industry. The residual heat from the glass fibers and the flow of air through the fibrous mat during the forming operation are generally sufficient to volatilize water from the binder, thereby leaving the remaining components of the binder on the fibers as a viscous or semi-viscous high solid liquid. The coated fibrous mat is transferred to a curing oven where heated air, for example, is blown through the mat to cure the binder and rigidly bond the glass fibers together.

Fiberglass binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins are not suitable for use as fiberglass binders. One skilled in the art of fiberglass binders would not look to cellulosic binders to solve any of the known problems associated with fiberglass binders.

Binders useful in fiberglass insulation products generally require a low viscosity in the uncured state, yet possess characteristics so as to form a rigid thermoset polymeric binder for the glass fibers when cured. A low binder viscosity in the uncured state is required to allow the mat to be sized correctly. Also, viscous binders commonly tend to be tacky or sticky and hence they lead to the accumulation of fiber on the forming chamber walls. This accumulated fiber may later fall onto the mat causing dense areas and product problems. A binder which forms a rigid matrix when cured is required so that a finished fiberglass thermal insulation product, when compressed for packaging and shipping, will recover to its as-made vertical dimension when installed in a building.

From among the many thermosetting polymers, numerous candidates for suitable thermosetting fiberglass binder resins exist. However, binder-coated fiberglass products are often of the commodity type, and thus cost becomes a driving factor, generally ruling out resins such as thermosetting polyurethanes, epoxies, and others. Due to their excellent cost/performance ratio, the resins of choice in the past have been phenol-formaldehyde resins. Phenol-formaldehyde resins can be economically produced, and can be extended with urea prior to use as a binder in many applications. Such urea-extended phenol-formaldehyde binders have been the mainstay of the fiberglass insulation industry for years, for example.

Over the past several decades however, minimization of volatile organic compound emissions (VOCs) and hazardous air pollutants (HAPS) both on the part of the industry desiring to provide a cleaner environment, as well as by Federal regulation, has led to extensive investigations into not only reducing emissions from the current formaldehyde-based binders, but also into candidate replacement binders. For example, subtle changes in the ratios of phenol to formaldehyde in the preparation of the basic phenol-formaldehyde resole resins, changes in catalysts, and addition of different and multiple formaldehyde scavengers, has resulted in considerable improvement in emissions from phenol-formaldehyde binders as compared with the binders previously used. However, with increasingly stringent Federal regulations, more and more attention has been paid to alternative binder systems which are free from formaldehyde.

One such candidate binder system employs polymers of acrylic acid as a first component, and a polyol such as triethanolamine, glycerine, or a modestly oxyalkylated glycerin as a curing or "crosslinking" component. The preparation and properties of such poly(acrylic acid)-based binders, including information relative to the VOC emissions, and a comparison of binder properties versus urea-formaldehyde binders is presented in "Formaldehyde-Free Crosslinking Binders For Non-Wovens," Charles T. Arkins et al., TAPPI Journal, Vol. 78, No. 11, pages 161-168, November 1995. The binders disclosed by the Arkins article, appear to be B-stageable as well as being able to provide physical properties similar to those of urea/formaldehyde resins.

U.S. Pat. No. 5,340,868 discloses fiberglass insulation products cured with a combination of a polycarboxy polymer, α-hydroxyalkylamide, and at least one trifunctional monomeric carboxylic acid such as citric acid. The specific polycarboxy polymers disclosed are poly(acrylic acid) polymers. See also, U.S. Pat. No. 5,143,582.

U.S. Pat. No. 5,318,990 discloses a fibrous glass binder which comprises a polycarboxy polymer, a monomeric trihydric alcohol and a catalyst comprising an alkali metal salt of a phosphorous-containing organic acid.

U.S. 2007/0142596 discloses binders comprised of a mixture of Maillard reactants. The reactants comprise a monosaccharide and an ammonium salt of a polycarboxylic acid.

Published European Patent Application EP 0 583 086 A1 appears to provide details of polyacrylic acid binders whose cure is catalyzed by a phosphorus-containing catalyst system as discussed in the Arkins article previously cited. Higher molecular weight poly(acrylic acids) are stated to provide polymers exhibiting more complete cure. See also U.S. Pat. Nos. 5,661,213; 5,427,587; 6,136,916; and 6,221,973.

Some polycarboxylic polymers have been found useful for making fiberglass insulation products. Problems of clumping or sticking of the glass fibers to the inside of the forming chambers during the processing, as well as providing a final product that exhibits the recovery and rigidity necessary to provide a commercially acceptable fiberglass insulation product, have been overcome. See, for example, U.S. Pat. No. 6,331,350. The thermosetting acrylic resins have been found to be more hydrophilic than the traditional phenolic binders, however. This hydrophilicity can result in fiberglass insulation that is more prone to absorb liquid water, thereby possibly compromising the integrity of the product. Also, the thermosetting acrylic resins now being used as binding agents for fiberglass have been found to not react as effectively with silane coupling agents of the type traditionally used by the industry increasing product cost. The addition of silicone as a hydrophobing agent results in problems when abatement devices are used that are based on incineration as well as additional cost. Also, the presence of silicone in the manufacturing process can interfere with the adhesion of certain facing substrates to the finished fiberglass material. Overcoming these problems will help to better utilize polycarboxylic polymers in fiberglass binders.

Accordingly, in one aspect the present invention provides a novel, non-phenol-formaldehyde binder.

Another aspect of the invention provides a novel fiberglass binder which provides advantageous flow properties, the possibility of lower binder usage, the possibility of overall lower energy consumption, elimination of interference in the process by a silicone, and improved overall economics.

Still another aspect of the present invention is to provide a binder for fiberglass having improved economics, while also enjoying improved physical properties. In addition, the present invention increases the sustainable portion of the binder and reduces the dependency on a fossil based source for the resin.

These and other aspects of the present invention will become apparent to the skilled artisan upon a review of the following description and the claims appended hereto.

BRIEF SUMMARY OF THE INVENTION

A curable composition for use in the binding of fiberglass is provided comprising an addition product of an amine and a saturated or unsaturated reactant in the form of an amino-amide intermediate. To this intermediate is added an aldehyde or ketone, preferably a reducing sugar, to form a curable binder composition. This composition upon curing is capable of forming a water-insoluble polymer composition which exhibits good adhesion to glass.

Additional examples of the present curable, formaldehyde-free binder compositions include compositions having an aldehyde or ketone, a reaction product between a polyamine and an organic anhydride, and an acidic compound. The acidic compound may be an organic acid, an acidic catalyst, or both. The acidic compound is supplied in quantities that lower the pH of the binder composition to about 5 or less. When the binder compositions are heat cured, the aldehyde or ketone react with the reaction product to form the polymerized binder.

A process for binding fiberglass is provided comprising applying to fiberglass a coating of a composition comprising an addition product of an amine and a saturated or unsaturated reactant in the form of an amino-amide intermediate, to which is added an aldehyde or ketone. Thereafter the composition is cured while present as a coating on the fiberglass to form a water-insoluble polymer composition which exhibits good adhesion to the fiberglass.

In one embodiment, the reaction product of a polyamine and an organic anhydride may be the amino-amide intermediate. The intermediate may undergo heating to create an amino-amide oligomer before being introduced to the aldehyde or ketone. The aldehyde or ketone and the acidic compound are then added to the amino-amide oligomer, and the resulting binder composition is applied to fiberglass and cured to make a fiberglass product.

In a preferred embodiment the resulting fiberglass product is building insulation. A roofing membrane is also a useful application. In other embodiments the fiberglass product is a microglass-based substrate useful when forming a printed circuit board, battery separator, filter stock, or reinforcement scrim.

DETAILED DESCRIPTION OF THE INVENTION

The novel fiberglass binder composition of the present invention is a curable composition comprising the reaction product of an amine and a saturated or unsaturated reactant to form an amino-amide intermediate.

In accordance with one embodiment of the invention, amine reactants are selected which are capable of undergoing conjugate addition to form the requisite amino-amide, which forms a water-insoluble polyimide upon curing. In such an embodiment the amine is a di- or multi-functional primary or secondary amine. More preferably, the amine is a diamine having at least one primary amine group.

Example of amines include, but are not limited to, aliphatic, cycloaliphatic and aromatic amines. The amines may be linear or branched. The amine functionalities may be di- or multifunctional primary or secondary amines. The amines can include other functionalities and linkages such as alcohols, thiols, esters, amides, acids, ethers and others.

Representative amines that are suitable for use in such an embodiment include 1,2-diethylamine, 1,3-propanediamine, 1,4-butanediamine, 1,5-pentanediamine, 1,6-hexanediamine, .alpha.,.alpha.'-diaminoxylene, diethylenetriamine, triethylenetetramine, tetraethylenepentamine, and mixtures of these. Preferred diamines for use in this embodiment of the invention are 1,4-butanediamine and 1,6-hexanediamine. Natural and synthetic amino acids such as lysine, anginine, hestidine, etc. can also be used.

The curable amino-amide is formed through the selection of an unsaturated or saturated reactant that is an anhydride, carboxylic acid, ester, and salts and mixtures of such reactants. Representative unsaturated reactants are maleic acid, fumaric acid, maleic anhydride, mono- and di-esters of maleic acid and fumaric acid, and salts and mixtures of these. Ammonium salts of the unsaturated acids of their monoesters conveniently can be utilized. A preferred unsaturated reactant is maleic anhydride. Representative saturated reactants include, but are not limited to, succinic anhydride, succinic acid, mono and diesters of succinic acid, glutaric acid and anhydride, phthalic acid and anhydride, tetrahydro phthaic acid and anhydride, mono and diesters of acid anhydrides and salts of the acids, and their mono esters. A preferred saturated reactant is phthalic anhydride or tetrahydro phthalic anhydride.

The amino-amide addition products can be readily formed by mixing the components in an aqueous medium at room temperature. The resulting addition products are either water-soluble, water-dispersible, or are present as an emulsion. To the solution of amino-amide, the carbonyl functional materials can be added, especially an aldehyde or ketone. Due to their higher reactivity, aldehydes are preferred to ketones. The composition comprises the amino-amide and the aldehyde and/or ketone. Some reaction does take place within the composition between the components. However, the reaction is completed during the curing step, followed by the cross-linking reaction of curing.

Examples of suitable aldehydes include, but are not limited to, mono- and multifunctional aldehydes including acetaldehyde, hydroxy acetaldehyde, butyraldehyde, acrolein, furfural, glyoxal, glyceraldehyde, glutaraldehyde, polyfurfural, polyacrolein, copolymers of acrolein and others. Reducing mono, di- and polysaccharides such as glucose, maltose, etc. can be used, with reducing monosaccharides such as glucose being preferred.

Examples of ketones include, but are not limited to, acetone, acetyl acetone, 1,3-dihydroxy acetone, benzyl, benzoin, fructose, etc.

The aldehydes and ketones react with the amino-amide intermediate, which contains an amic acid function, i.e., an amide linkage in the vicinity of a carboxylic acid. An amic acid function is more reactive than a simple carboxylic acid. The amount of aldehyde and/or ketone added is generally such that the molar ratio of carboxylic acid in the amino-amide to carbonyl or ketone is from 1:5 to 50:1. A ratio of 1:20 to 20:1 is more preferred, with a ratio of 1:10 to 10:1 being most preferred.

One advantage is that the presence of all functional groups, i.e., amine, amide and carboxylic acid, on the same molecule eliminates the potential need for the addition of external crosslinkers or binders such as polycarboxylic acids and/or polyvinyl alcohol. Such crosslinkers can be added, however if desired.

In an embodiment, the amino-amide can be first oligomerized prior to adding the aldehyde or ketone. The amino-amide can be heated until an oligomer is obtained, e.g., a dimer, trimer or tetramer of the amino-amide intermediate. An example of suitable conditions for making the oligomer involves heating in the range of from 120-150° C. for up to 5 hours.

Using the oligomerized product has been found to result in a more robust binder product upon curing. This manifests itself in the strength of the binder, and allows for better storage results, higher tensile strength and rigidity, and better recovery for products made with the binder.

The composition when applied to the fiberglass optionally can include adhesion prompters, oxygen scavengers, solvents, emulsifiers, pigments, fillers, anti-migration aids, coalescent aids, wetting agents, biocides, plasticizers, organosilanes, anti-foaming agents, colorants, waxes, suspending agents, anti-oxidants, crosslinking catalysts, secondary crosslinkers, and combinations of these.

The binder composition may also include acids and/or acidic catalysts that lower the overall pH of the binder. Exemplary acids include organic acids that have one or more carboxylic acid groups. For example, the organic acid may be a monocarboxylic acid such as a $C_1$-$C_{12}$ carboxylic acid (e.g., acetic acid), or an aromatic carboxylic acid (e.g., benzoic acid), among others. Exemplary organic acids may also include dicarboxylic acids such aliphatic dicarboxylic acids, unsaturated (e.g., olefinic) dicarboxylic acids, and aromatic dicarboxylic acids, among others. Exemplary aliphatic dicarboxylic acids may include oxalic acid, malonic acid, succinic acid, glutaric acid, adipic acid, pimelic acid, suberic acid, azelaic acid, sebacic acid, undecanedioic acid, and dodecanedioic acid, among others. Exemplary olefinic dicarboxylic acids may include maleic acid, fumaric acid, glutaconic acid, traumatic acid, itaconic acid, and muconic acid among others. Exemplary aromatic dicarboxylic acids may include phthalic acid, isophthalic acid, and terephthalic acid, among others. Exemplary organic acids may also include tricarboxylic acids such as citric acid, isocitric acid, aconitic acid, propane-1,2,3-tricarboxylic acid, and trimesic acid, among others. Still further examples of organic acids may include polycarboxylic acids having two or more carboxylic acid groups, such as mellitic acid, tartaric acid, etc.

Exemplary acidic catalysts include salts of sulfuric ($H_2SO_4$), phosphoric ($H_3PO_4$), or nitric acid ($HNO_3$). These include ammonium salts of the acids, where one or more hydrogen ions supplied by the acid are substituted with an ammonium cation ($NH_4^+$). Exemplary ammonium salt acidic catalysts include mono-ammonium sulfate ($NH_4$)$HSO_4$, di-ammonium sulfate ($NH_4$)$_2SO_4$, mono-ammonium phosphate ($NH_4$)$H_2PO_4$, and di-ammonium phosphate ($NH_4$)$_2HPO_4$, among others.

The fiberglass to which the composition according to the present invention is applied may take a variety of forms and in a preferred embodiment is building insulation. Roofing membranes is also a useful application due to good characteristics. In other embodiments the fiberglass is a microglass-based substrate useful in applications such as printed circuit boards, battery separators, filter stock, and reinforcement scrim.

The composition of the present invention can be applied to the fiberglass by a variety of techniques. In preferred embodiments these include spraying, spin-curtain coating, and dipping-roll coating. The composition can be applied to freshly-formed fiberglass, or to the fiberglass following collection. Water or other solvents can be removed by heating.

Thereafter the composition undergoes curing wherein a polymeric coating is formed which exhibits good adhesion to glass. The polymeric composition obtained upon curing is a combination of a polyamino-amide and a polyamino-imide. The polyimide is the primary product, but some of the amide in the intermediate is believed to not form the imide. Thus, some polyamino-amide is also present in the cured composition/binder.

Such curing can be conducted by heating. Elevated curing temperatures on the order of 100 to 300° C. generally are acceptable. Satisfactory curing results are achieved by heating in an air oven at 200° C. for approximately 20 minutes.

The cured binder at the conclusion of the curing step commonly is present as a secure coating on the fiberglass in a concentration of approximately 0.5 to 50 percent by weight of the fiberglass, and most preferably in a concentration of approximately 1 to 10 percent by weight of the fiberglass.

The present invention provides a formaldehyde-free route to form a securely bound formaldehyde-free fiberglass product. The binder composition of the present invention provides advantageous flow properties, the elimination of required pH modifiers such as sulfuric acid and caustic, and improved overall economics and safety. The binder also has the advantages of being stronger and offering lower amounts of relative volatile organic content during curing, which ensures a safer work place and environment. The cure time of the binder is also seen to be much faster and therefore does favor the economics, while reducing the energy consumption during the curing process and lowering the carbon footprint. The binder also contains a high level of sustainable raw materials further reducing the dependency on fossil based sources for the resin. Also, due to the hydrophobic nature of the binder, the need for a water repellant such as silicones is eliminated or greatly reduced.

The following examples are presented to provide specific examples of the present invention. In each instance the thin glass plate substrate that receives the coating can be replaced by fiberglass. It should be understood, however, that the invention is not limited to the specific details set forth in the Examples.

EXAMPLES

Preparation of Intermediates

To 116 g 1,6 diaminohexane (HMDA) dissolved in 214 g water, 98 g maleic anhydride (MAn) was added slowly (molar ratio of 1:1) and the solution was stirred for 10 min. The intermediate was labeled HM.

To 116 g HMDA dissolved in 264 g water was added to 148 g phthalic anhydride. After the anhydride dissolved, the intermediate was labeled HP.

To 116 g HMDA dissolved in 268 g water was added 152 g tetrahydro phthalic anhydride. The solution was stirred until all anhydride dissolved. The intermediate was labeled HT.

These intermediates were utilized to make the following resins with glucose.

Example 1

To 42.8 g of solution of the HM intermediate anhydrous dextrose (alpha-D-glucose) and water were added. The mass of added water was chosen to be equal to that of the corresponding dextrose. The mass of dextrose (and corresponding water) was 18 g, 36 g, 54 g, 72 g 90 g, 108, 144, 180 g and 216 g. The various solutions were stirred at ambient temperature for 10 mn. The solutions were applied as a thin film on glass and A1 panel, dried in an oven at 100° C. for 5 min and cured at 200° C. for 20 min. Each of the solutions formed a cured brown polymer which was hard and insoluble in water and solvents, and showed an excellent adhesion to glass.

Example 2

To 52.8 g of solution of the HP intermediate, anhydrous dextrose (alpha-D-glucose) and water were added. The mass of added water was chosen to be equal to that of the corresponding dextrose. The mass of dextrose (and corresponding water) was 18 g, 36 g, 54 g, 72 g, 90 g, 108, 144, 180 g and 216 g. The various solutions were stirred at ambient temperature for 10 min. The solutions were applied as a thin film on a glass and A1 panel, dried in an oven at 100° C. for 5 min and cured at 200° C. for 20 min. Each solution formed a cured brown polymer which was hard and insoluble in water and solvents, and showed an excellent adhesion to glass.

Example 3

To 53.6 g of solution of the HT intermediate, anhydrous dextrose (alpha-D-glucose) and water were added. The mass of added water was chosen to be equal to that of corresponding dextrose. The mass of dextrose (and corresponding water) was 18 g, 36 g, 54 g, 72 g, 90 g, 108, 144, 180 g and 216 g. The various solutions were stirred at ambient temperature for 10 min. The solutions were applied as a thin film on glass and A1 panel, dried in an oven at 100° C. for 5 min and cured at 200° C. for 20 min. Each solution formed a cured brown polymer which was hard and insoluble in water and solvents, and showed an excellent adhesion to glass.

Example 4

Examples 1-3 were repeated in the presence of 5% by weight ammonium sulfate. The polymers became insoluble in water in less than 10 min.

Example 5

To 116 g HMDA dissolved in 214 g water was added slowly 98 g maleic anhydride (Man), this was a molar ratio of 1:1. The resulting solution was refluxed for 60 minutes to prepare an amino-amide oligomer. The solution was opaque with 50% solids. The solution was then used to repeat example 1 with the observed results being the same, i.e., the cured polymer was hard and insoluble in water and solvents, and showed excellent adhesion to glass.

Example 6

Plant Trial

To examine the performance of the binder on an insulation batt, a binder solution was prepared and applied in the manufacture of the insulation batt. Processing and performance of the batts made with the binder of this invention was compared with the batts manufactured with a polyacrylic acid binder cured with triethanol amine.

To prepare the binder, 116 g HMDA was dissolved in 754 kg water. To this solution was added 98 kg maleic anhydride with stirring until dissolved. To this solution was added 540 kg anhydrous dextrose. When the dextrose dissolved, 37.7 kg ammonium sulfate was added. After all the ingredients dissolved, the clear binder solution was utilized in the manufacture of R-19 and R-13 insulation batt.

The binder was applied at the rate of 4.5% binder on glass fiber containing 1% (based on binder) of an amino-propyl silane coupling agent and about 0.5% dedusting oil. The batt was cured at 210° C. with an oven residence time of two minutes. The 32" droop (sag) and recovery data for R-19 insulation batt products are presented in Table 1 and Table 2 below respectively:

TABLE 1

32" Droop Data for R-19

|  | Unaged | 7 Day | 14 Day |
|---|---|---|---|
| Control (Acrylic) | 1.1 | 1.7 | 2.2 |
| HP | 1.0 | 1.3 | 1.6 |

TABLE 2

Recovery fir R-19

|  | Unaged | 7 Day | 14 Day |
|---|---|---|---|
| Control (Acrylic) | 6.91 | 6.48 | 6.38 |
| HP | 6.85 | 6.55 | 6.41 |

As seen from Table 1 and Table 2, the R-19 insulation product of the new formaldehyde free binder of this invention (HP) has better performance compared to the commercial acrylic control.

Addition of Organic Acids to Binder Compositions

Another set of experiments was performed to measure the effect of the binder's pH on the tensile strength of glass composites made with the binder. Binder compositions were made from a combination of (i) 1,6 hexanediamine (H), maleic anhydride (M), and dextrose (D) ("HMD"), with (ii) either maleic acid or citric acid. Comparative binder compositions of HMD without added acid were also made and tested.

The HMD component of the binder compositions had a mole ratio of 1,6 hexanediamine:maleic anhydride:dextrose of either 1:1:3 or 1:1:6. The maleic or citric acid was added to the HMD component in a 1:1 mole ratio. Table 3 below describes the compositions and pHs of six binder compositions used in the tensile strength tests that were graphed in FIG. 1:

TABLE 3

Compositions and pH of HMD Binders:

| Entry | Mole Ratio HMD | Organic Acid | Moles of Acid | pH |
|---|---|---|---|---|
| 1 | 1:1:6 | None | 0 | 6.5 |
| 2 | 1:1:6 | Maleic Acid | 1 | 3.0 |
| 3 | 1:1:6 | Citric Acid | 1 | 3.2 |
| 4 | 1:1:3 | None | 0 | 7.2 |
| 5 | 1:1:3 | Maleic Acid | 1 | 3.3 |
| 6 | 1:1:3 | Citric Acid | 1 | 3.4 |

As shown in Table 3, the pH of the comparative binder compositions with no added acid were very slightly acidic to alkaline, while the compositions with added maleic or citiric acid showed a drop in pH to a range from 3.0 to 3.4.

Each of the binder compositions was formulated into 25 g samples having a 50 wt. % solids level and mixed with 1000 g of glass beads to make uncured composites. Roughly 1 ounce samples of the uncured composites were then spread into dogbone molds and pressed in the molds at a pressure of about 10,000 lbs. The dogbone samples were then released from the molds and heated at about 400° F. for about 20 minutes to form cured dogbone composites. The cured dogbone composites were roughly 25 mm wide and 6 mm thick.

Figure 3:
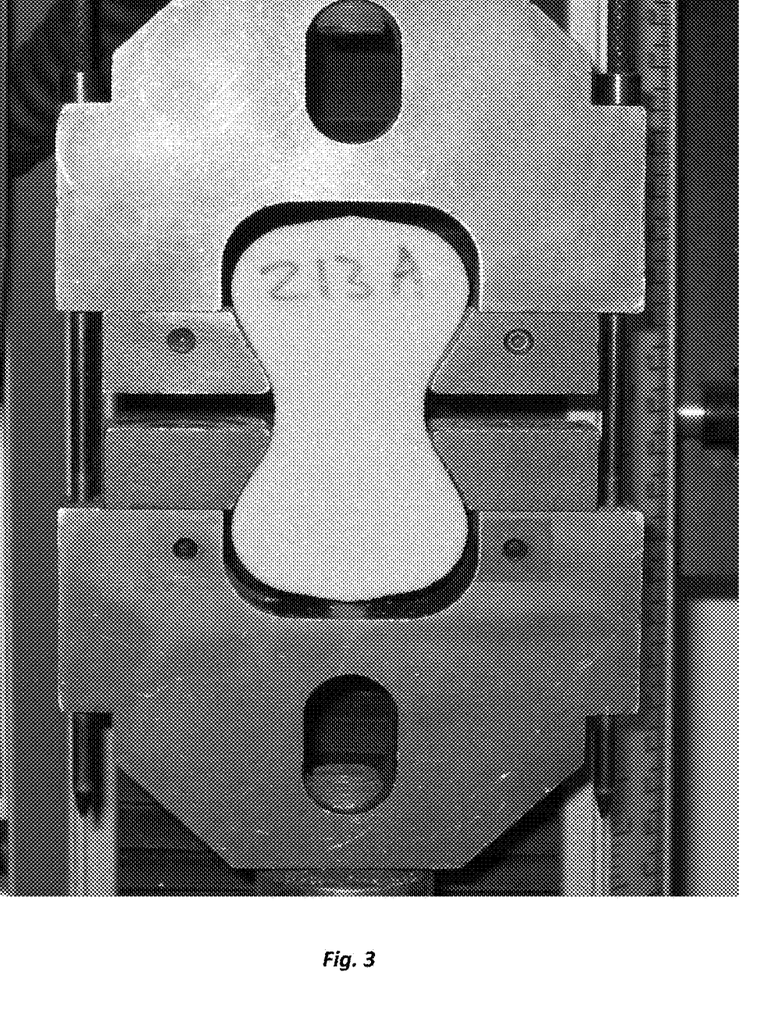
FIG. 3 is a picture of a cured dogbone composite placed in an Instron tensile strength measuring instrument.

The cured dogbone composites were tested for tensile strength in both an unaged condition and after being aged in a high humidity atmosphere. The unaged composites were taken directly from the curing oven and placed in an Instron tensile strength testing instrument (Harry W. Dietert Co.—Tensile Core Grip Assembly Part No. 610-7CA) as shown in FIG. 3. The aged composites were taken from the curing oven and placed for 24 hours in a humidifying oven set at approximately 95% humidity and 120° F. After the aged samples were cooled for approximately 8 hours, they were placed in the Instron instrument to test their tensile strength.

Figure 1:
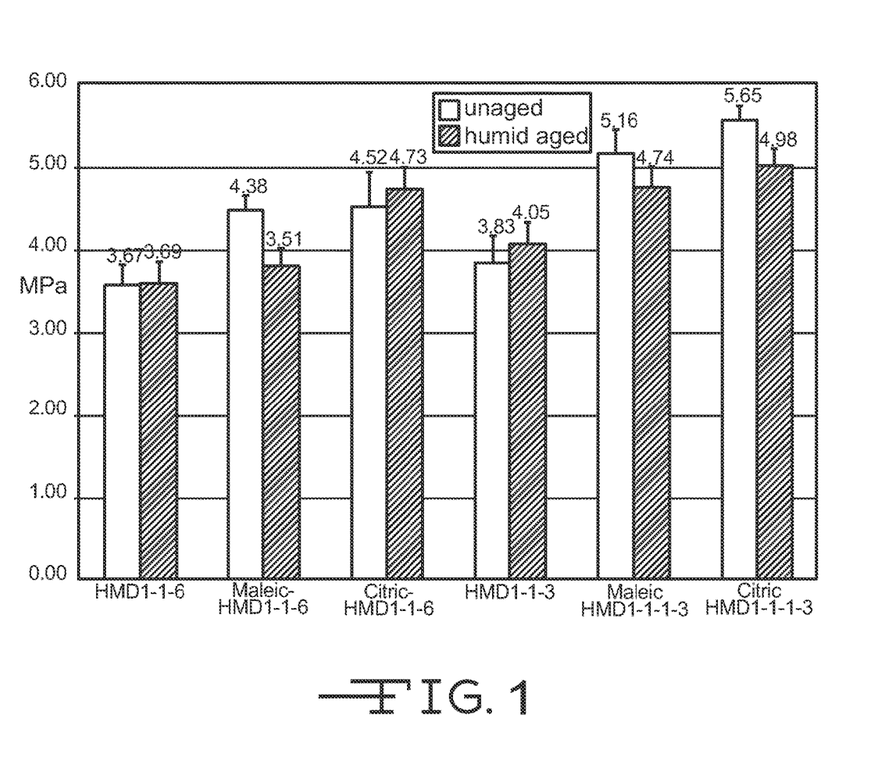
FIG. 1 is a graph showing tensile strength performance for a group of glass composites.

FIG. 1 shows the results of the strength tests for dogbone composites made with the binder compositions 1-6 listed in Table 3. The results in FIG. 1 show significant improvement in the tensile strength of the dogbone composites made with the acidified binder compositions. Acidified HMD binder compositions having a 1:1:6 mole ratio of H:M:D showed an approximately 26% increase in tensile strength compared to the 1:1:6 HMD binder composition with no added organic acid. Acidified HMD binder compositions having a 1:1:3 mole ratio of H:M:D showed even larger increases in tensile strength (about 35-45% higher) than the comparative unacidified 1:1:3 HMD binder composition. For both HMD binder compositions, the acidification of the binder with an organic acid provided a significant increase in composite's tensile strength compared to the unacidified binder compositions.

Addition of Acidic Catalysts to Binder Compositions

Another set of experiments were conducted to determine whether decreasing binder pH using acidic catalysts made from inorganic ammonium sulfates and phosphates could also increase the tensile strength of glass-containing composites made with the binder compositions. In this set of experiments catalysts were added to a binder compositions of 1,6 hexanediamine (H), maleic anhydride (M), and dextrose (D) having a mole ratio of 1,6 hexanediamine:maleic anhydride:dextrose of 1:1:6. Table 4 below describes the four binder-catalyst compositions used in the tensile strength tests graphed in FIG. 2:

TABLE 4

Compositions and pH of HMD/Catalyst Binders:

| Entry | Mole Ratio H:M:D | Catalyst (wt. % of Binder Composition) | pH |
|---|---|---|---|
| 1 | 1:1:6 | 5% $(NH_4)_2SO_4$ | 6.5 |
| 2 | 1:1:6 | 5% $(NH_4)HSO_4$ | 4.5 |
| 3 | 1:1:6 | 5% $(NH_4)H_2PO_4$ | 6.0 |
| 4 | 1:1:6 | 10% $(NH_4)H_2PO_4$ | 5.2 |

Figure 2:
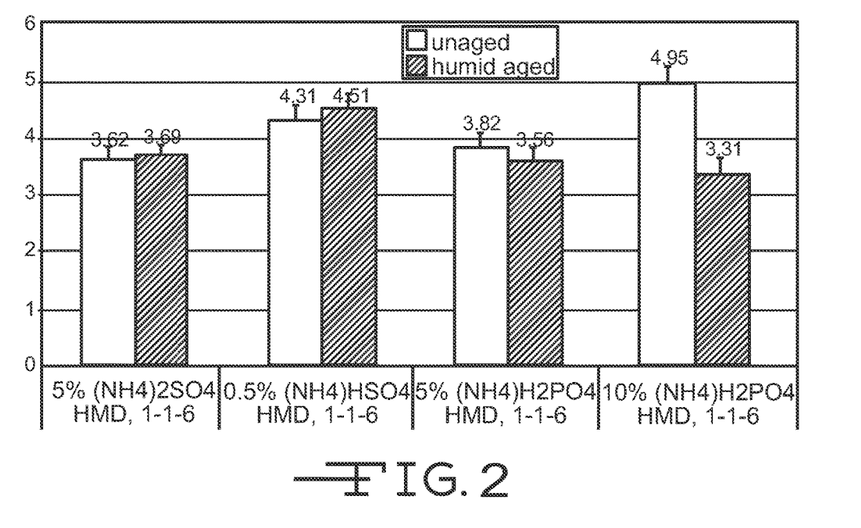
FIG. 2 is a graph showing tensile strength performance for another group of glass composites.

Binder compositions 1-4 were each mixed with glass beads to form uncured composites that were then molded, pressed, and heat cured into dogbone composites as described in the organic acid addition tests above. The dogbone composites were they placed in the Instron tensile strength testing instrument and the tensile strength test results were recorded and graphed in FIG. 2. As FIG. 2 shows, the addition of the more acidic mono-ammonium sulfate to the binder produced a dogbone composite with significantly higher tensile strength than the more alkaline di-ammonium sulfate catalyst. Improved tensile strength of unaged dogbone composites was also observed when the amount of mono-ammonium phosphate was doubled from 5% to 10%, resulting a drop in the binder composition pH from 6.0 to 5.2.

The experimental results of adding an organic acid (e.g., maleic acid, citric acid) or an acidic catalyst (e.g., acidic ammonium sulfate and phosphate salts) show that the addition of these compounds in amounts that reduce the binder composition's pH below 5.0 can significantly increase the tensile strength of glass-fiber composites made with the acidified binders. A reduction in the alkalinity of the binder compositions may also increase their tensile strength at pHs above 5.0, although the magnitude of the increase may not be as large.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A formaldehyde-free binder composition comprising:
   an aldehyde or ketone;
   a reaction product between a polyamine and an organic anhydride, wherein
      the reaction product comprises an amino-amide oligomer,
      the polyamine is selected from the group consisting of ethylene diamine, 1,3-propanediamine, 1,4-butanediamine, 1,5-pentanediamine, 1,6-hexanediamine, $\alpha,\alpha'$-diaminoxylene, diethylenetriamine, triethylenetetramine, and tetraethylenepentamine, and
      the amino-amide oligomer and the aldehyde or ketone have a molar ratio from 1:3 to 1:10; and
   an acidic catalyst to catalyze the reaction between the amino-amide oligomer and the aldehyde or ketone, wherein:
   the pH of the binder composition is 5 or less, and
   the amino-amide oligomer is a dimer, trimer, or tetramer.

2. The formaldehyde-free binder composition of claim 1, wherein the acidic catalyst comprises an ammonium salt of an inorganic acid.

3. The formaldehyde-free binder composition of claim 1, wherein the acidic catalyst comprises an ammonium salt of sulfuric acid or phosphoric acid.

4. The formaldehyde-free binder composition of claim 1, wherein the acidic catalyst comprises an ammonium salt of an inorganic acid chosen from mono-ammonium sulfate, di-ammonium sulfate, mono-ammonium phosphate, and di-ammonium phosphate.

5. The formaldehyde-free binder composition of claim 1, wherein the aldehyde or ketone is a reducing sugar.

6. The formaldehyde-free binder composition of claim 1, wherein the organic anhydride is one or more anhydrides chosen from maleic anhydride, itaconic anhydride, phthalic anhydride, and tetrahydrophthalic anhydride.

7. The formaldehyde-free binder composition of claim 1, wherein the binder composition comprises one or more additional compounds chosen from adhesion promoters, oxygen scavengers, moisture repellants, solvents, emulsifiers, pigments, fillers, anti-migration aids, coalescent aids, wetting agents, biocides, plasticizers, organosilanes, antifoaming agents, colorants, waxes, suspending agents, antioxidants, and crosslinking catalysts.

8. The method of claim 1, wherein the acidic compound and the reaction product are present at a molar ratio of 1:1.

9. The method of claim 1, wherein the reaction product is the product of a reaction between the polyamine and the organic anhydride at a molar ratio of 1:1.

10. The formaldehyde-free binder composition of claim 1, wherein the amino-amide oligomer is an amino-amide dimer.

11. The formaldehyde-free binder composition of claim 1, wherein the amino-amide oligomer is an amino-amide trimer.

12. The formaldehyde-free binder composition of claim 1, wherein the amino-amide oligomer is an amino-amide tetramer.

13. A fiber-reinforced composite comprising:
   glass fibers; and
   a cured binder formed from a binder composition comprising:
      an aldehyde or ketone,
      a reaction product between a polyamine and an organic anhydride at a molar ratio of 1:1, wherein the reaction product comprises an amino-amide oligomer, and
      an acidic catalyst to catalyze the reaction between the amino-amide oligomer and the aldehyde or ketone, wherein:
      the pH of the binder composition is 5 or less, and
      the amino-amide oligomer is a dimer, trimer, or tetramer.

14. The fiber-reinforced composite of claim 13, wherein the fiber-reinforced composite comprises a fiberglass building insulation.

15. A method of binding fiberglass, the method comprising:
   applying a binder composition to a mat of fiberglass; and
   curing the binder composition applied to the fiberglass, wherein the binder composition comprises:
      an aldehyde or ketone,
      a reaction product between a polyamine and an organic anhydride at a molar ratio of 1:1, wherein the reaction product comprises an amino-amide oligomer, and
      an acidic catalyst to catalyze the reaction between the amino-amide oligomer and the aldehyde or ketone, wherein:
      the pH of the binder composition is 5 or less, and
      the amino-amide oligomer is a dimer, trimer, or tetramer.

16. The method of claim 15, wherein the amino-amide and the aldehyde or ketone have a molar ratio from 1:3 to 1:10.

* * * * *